(12) United States Patent
Unno et al.

(10) Patent No.: US 8,041,358 B2
(45) Date of Patent: Oct. 18, 2011

(54) BASE STATION APPARATUS AND CELL SWITCHING DETERMINATION METHOD

(75) Inventors: Masataka Unno, Kawasaki (JP); Jun Ohyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 166 days.

(21) Appl. No.: 12/505,761

(22) Filed: Jul. 20, 2009

(65) Prior Publication Data

US 2009/0280816 A1  Nov. 12, 2009

Related U.S. Application Data

(63) Continuation of application No. PCT/JP2007/051253, filed on Jan. 26, 2007.

(51) Int. Cl.
*H04W 36/00* (2009.01)

(52) U.S. Cl. ............... 455/440; 455/422.1; 455/456.5; 370/333

(58) Field of Classification Search .......... 455/440, 455/403, 422.1, 436, 450–457; 370/310, 370/328–333
See application file for complete search history.

(56) References Cited

U.S. PATENT DOCUMENTS

| | | | |
|---|---|---|---|
| 6,327,472 B1 | 12/2001 | Westroos et al. | |
| 2002/0142773 A1 | 10/2002 | Rudrapatna et al. | |
| 2003/0176192 A1* | 9/2003 | Morimoto et al. | 455/453 |
| 2003/0179731 A1 | 9/2003 | Noguchi et al. | |
| 2003/0224774 A1* | 12/2003 | Cheng et al. | 455/422.1 |
| 2005/0141477 A1 | 6/2005 | Tomita et al. | |
| 2005/0259663 A1 | 11/2005 | Ode et al. | |
| 2006/0030323 A1 | 2/2006 | Ode et al. | |
| 2007/0070950 A1* | 3/2007 | Han et al. | 370/332 |

FOREIGN PATENT DOCUMENTS

| | | |
|---|---|---|
| JP | 2002320277 | 10/2002 |
| JP | 2003348007 | 12/2003 |
| JP | 2005244905 | 9/2005 |
| WO | 0028767 | 5/2000 |
| WO | 2004030396 | 4/2004 |
| WO | 2004075589 | 9/2004 |
| WO | 2004112419 | 12/2004 |

OTHER PUBLICATIONS

International Search Report dated May 1, 2007.
Technical Specification Group Radio Access Network, "Radio Resource Control (RRC) protocol specification (Release 1999)" 3rd Generation Partnership Project, 3GPP TS 25.331 V3.21.0, Dec. 2004 Chapter 14.

* cited by examiner

*Primary Examiner* — Nick Corsaro
*Assistant Examiner* — Chuong A Ngo
(74) *Attorney, Agent, or Firm* — Murphy & King, P.C.

(57) ABSTRACT

The base station apparatus includes a calculating unit configured to calculate a total communication throughput value for every cell by totalizing communication throughput in the selected cell of each mobile terminal on a cell-basis, a receiving unit configured to receive reception quality information of the selected cell and the reception quality information of another movement destination cell in the plurality of cells, a judging unit configured to judge whether or not the mobile terminal is in a cell switching zone by obtaining a difference between the reception quality information of the selected cell and of the movement destination cell, and a determining unit configured to determine, if the mobile terminal is judged to be in the cell switching zone, the cell switching to the movement destination cell as a newly selected cell by comparing the total communication throughput value of the selected cell with that of the movement destination cell.

10 Claims, 16 Drawing Sheets

FIG. 15

| CELL A | | | CELL B | | |
|---|---|---|---|---|---|
| | CPICH Ec/No [dB] | HSDPA COMMUNICATION THROUGHPUT [kbps] | | CPICH Ec/No [dB] | HSDPA COMMUNICATION THROUGHPUT [kbps] |
| TERMINAL A1 | −20 | 200 | TERMINAL B1 | −4 | 5000 |
| TERMINAL A2 | −20 | 200 | TERMINAL B2 | −4 | 5000 |
| TERMINAL A3 | −20 | 200 | TERMINAL B3 | −5 | 4000 |
| TERMINAL A4 | −15 | 400 | | | |
| TOTAL IN CELL | | 1000 | TOTAL IN CELL | | 14000 |

FIG. 16

| | CELL A | | | CELL B | |
|---|---|---|---|---|---|
| | CPICH Ec/No [dB] | HSDPA COMMUNICATION THROUGHPUT [kbps] | | CPICH Ec/No [dB] | HSDPA COMMUNICATION THROUGHPUT [kbps] |
| TERMINAL A1 | -20 | 200 | TERMINAL B1 | -4 | 4900 |
| TERMINAL A2 | -20 | 200 | TERMINAL B2 | -4 | 4900 |
| TERMINAL A3 | -20 | 200 | TERMINAL B3 | -5 | 3800 |
| | | | TERMINAL A4 | -15 | 400 |
| TOTAL IN CELL | | 600 | TOTAL IN CELL | | 14000 |

BASE STATION APPARATUS AND CELL SWITCHING DETERMINATION METHOD

CROSS-REFERENCE TO RELATED APPLICATIONS

This is a continuation of Application PCT/JP2007/051253, filed on Jan. 26, 2007, now pending, the contents of which are herein wholly incorporated by reference.

FIELD

The present invention relates generally to a mobile communication system including a base station apparatus performing data communications with a mobile terminal via a data channel of one cell of a plurality of cells, and more particularly to a cell switching determination method in the base station apparatus.

BACKGROUND

In a cellular mobile communication system using a W-CDMA (Wideband Code Division Multiple Access) method, a control station, a base station and a mobile station (mobile terminal) execute a predetermined control sequence, whereby the mobile station moving over one cell from another cell during communications can continue the communications. In this control sequence, for example, when detecting the over-the-cell movement of the mobile station, each of the control station, the base station and the mobile station switches over a communication route in synchronization.

By the way, there are at least two types of data channels utilized for the communications between the base station and the mobile station. One type of the data channel is a data channel via which the communications can be performed simultaneously in the plurality of cells, and another type is a data channel via which the communications can be performed only in the single cell. In the cellular mobile communication system using the W-CDMA method, a dedicated channel (DCH) is given as the former type of data channel, and a common channel (HS-PDSCH (High Speed Physical Downlink Shared Channel)) in HSDPA (High Speed Downlink Packet Access) communications is given as the latter type of data channel. In the HSDPA communications, the data is transmitted at a high speed by performing time-scheduling via the common channel, and it is therefore impossible to transmit the same data to one mobile station simultaneously from the plurality of cells.

When moving to another cell, the control sequence when moving over the cell is executed corresponding to these types of the data channels. Non-Patent document 1 given below discloses a control method in the former type of dedicated channel when moving over the cell. According to this control method, a way of how the cell is added and deleted is controlled based on a result of measuring a CPICH (Common Pilot Channel) reception quality (Ec/No (main signal level/interference level), sent from each cell and a result of measuring a path loss in the mobile station.

FIG. 12 is a diagram illustrating a concept of the control method when moving over the cell with respect to the dedicated data channel in case that a cell A and a cell B exist and a result of measuring the CPICH reception quality is the basis. In FIG. 12, the CPICH reception quality from the cell A is expressed by Ec/No_A, and the CPICH reception quality from the cell B is expressed by Ec/No_B.

The mobile station moves in a status of performing the communications in the cell A serving as a main cell (a cell offering the best reception quality in the active cells) and, when a difference between Ec/No_A and Ec/No_B becomes equal to or smaller than an additional threshold value (ΔEc/No FOR ADD) (e.g., 3 [dB]), sets the active cells to the cell A and the cell B, wherein a zone where communications with these plural cells are performed is defined as a soft handover (SHO) zone. In this zone, an instruction etc related to transmission power control is output from, e.g., the main cell.

In the SHO zone, the mobile station receives radio waves simultaneously from the cells A and B and synthesizes the radio waves. A shift to the SHO zone is normally made when the mobile station exists in the vicinity of a border between the cells, however, the weak radio waves from each cell can be compensated by this SHO method. Note that in the SHO zone also, the mobile station can, if the cell offering the best Ec/No is switched, change recognition of the main cell, corresponding to that.

The mobile station moves in the status of setting the plurality of cells to the active cells and performing the communications by use of the SHO method, consequently excludes the cell offering a deteriorated Ec/No value becoming equal to or larger than a delete threshold value (ΔEc/No FOR DELL) (e.g., 9 [dB]) from the active cells, and shifts to single-cell communications from plural-cell communications.

On the other hand, in the control method when moving over a cell in the common channel in the latter HSDPA communications, the simultaneous communications with the plurality of cells do not happen, and hence, just when replacing the cell offering the best reception quality Ec/No of CPICH, the communication cell is only switched over (cell change operation). FIG. 13 is a diagram illustrating a concept of the control method when moving to another cell with respect to the common channel in case that the cell A and the cell B exist and a result of measuring the CPICH reception quality is the basis.

According to this method, in the same way as the control of the dedicated channel, the CPICH reception quality Ec/No measured on the side of the mobile station and sent from each cell is reported to the control station, and the control station selectively determines the best cell by comparing the reception qualities of the respective cells with each other and notifies the base station and the mobile station of movement destination cell information and movement timing. This control method has no difference between the case of moving over a base station and a case of moving over a different cell segment from another different divided cell within the same base station.

In the case of performing the HSDPA communications such as this, the dedicated channel might be simultaneously set up as well as setting up the common channel for the HSDPA. This being the case, in the same way as the cell moving control method in the dedicated channel, with respect to also the cell switching via the common channel for the HSDPA, it is a general practice that only the CPICH reception quality transmitted from each cell is set as the basis for the cell switching.

Moreover, Patent document 1 given below discloses a technology by which the base station mainly collects pieces of reception quality information (CQI (Channel Quality Indicator)) etc of the mobile stations, and performs the cell switching to another cell having a different carrier frequency for the mobile station with occurrence of a call loss and occurrence of deterioration in reception quality. Note that the following are other disclosed documents of the conventional art related to the invention of the present application.

[Non-Patent document 1] Technical Specification Group Radio Access Network, "Radio Resource Control (RRC) protocol specification (Release 1999)", 3rd Generation Partnership Project, 3GPP TS 25.331 V3.21.0, December 2004, Chapter 14.

[Patent document 1] International Publication WO 2004/112419

[Patent document 2] International Publication WO 2004/075589

SUMMARY

If the mobile station stays long in the vicinity of a cell border in the case of performing the HSDPA communications of the conventional art described above, however, a cell switching event as illustrated in FIG. 13 occurs frequently.

Such being the case, the cell switching via the common channel for the HSDPA also requires a fixed control width as by the method of adding and deleting the communication cell in the dedicated channel.

The cell switching control such as this, however, has a characteristic that a throughput of one user (one mobile station) depends on the throughputs of other users (other mobile stations) embraced by the cell, in which case it might happen that the throughput of the data channel as a whole within the base station decreases due to the execution of the cell switching.

Note that Patent document 1 given above describes the method of measuring the throughput per mobile station when deciding handover to a different frequency cell and executing the handover of a specified mobile station with occurrence of a deteriorated throughput. This technique is incapable of solving the above-mentioned problem related to the movement to the cell having the same frequency. Namely, this technique intends to ameliorate the deteriorated quality of the specified mobile station but can not solve the problem that the throughput of the whole base station decreases.

The present invention adopts the following configurations in order to solve the problems given above. Namely, the present invention is relative to a base station apparatus forming a plurality of cells, selecting any one of the cells and performing data communications with a mobile terminal via a data channel of the selected cell, comprising: a calculating unit configured to calculate a total communication throughput value for every cell by totalizing communication throughput in the selected cell of each mobile terminal on a cell-basis; a receiving unit configured to receive reception quality information of the selected cell and the reception quality information of another movement destination cell in the plurality of cells, which are generated by the mobile terminal; a judging unit configured to judge whether or not the mobile terminal is in a cell switching zone by obtaining a difference between the reception quality information of the selected cell and the reception quality information of the movement destination cell, which are received by the receiving unit; and a determining unit configured to determine, if the mobile terminal is judged to be in the cell switching zone, the cell switching to the movement destination cell as a newly selected cell by comparing the total communication throughput value of the selected cell with the total communication throughput value of the movement destination cell, which are calculated by the calculating unit.

Herein, the data channel is, e.g., HS-PDSCH in HSDPA communications.

In the base station apparatus according to the present invention, on the occasion of determining the cell switching, the reception quality information of each cell is received from the mobile terminal, it is determined based on a difference between the received pieces of reception quality information of the respective cells whether or not the mobile terminal is in the cell switching zone. Further, when determining that the mobile terminal is in the cell switching zone, the cell switching to the movement destination cell as a newly selected cell is determined by comparing between a total communication throughput value of the selected cell and a total communication throughput value of the movement destination cell.

Namely, in the base station apparatus according to the present invention, when determining the cell switching for a mobile terminal, the communication throughput on a cell-basis between the in-selection cell and the movement destination cell is taken into consideration.

For instance, the determining unit, if the total communication throughput value of the movement destination cell is smaller than the total communication throughput value of the selected cell, may determine the cell switching to the movement destination cell as the newly selected cell.

This scheme, according to the present invention, can prevent the communication throughput of the whole base station from decreasing due to the cell switching for the mobile terminal.

Moreover, the determining unit, after once determining the cell switching for the mobile terminal during a period for which the mobile terminal is in the cell switching zone, may not execute the process of making the comparison between the total communication throughput values for the mobile terminal.

This scheme, according to the present invention, can prevent, even when the mobile terminal stays in the vicinity of a border between the cells, i.e., in the cell switching zone, the communication throughput from decreasing due to frequent occurrence of the cell switching.

Further, the determining unit, if the judging unit judges that the mobile terminal exits the cell switching zone, may determine the cell switching to the cell, as the newly selected cell, which offers a high reception quality, in the selected cell at the time and other cells.

With this scheme, according to the present invention, even when the mobile terminal moves on such a route that the mobile terminal moves up to the vicinity of the cell border from one cell toward another cell and moves back toward the one cell, the cell switching is properly determined.

Moreover, the judging unit may set the cell switching zone judged based on the difference between the reception quality information of the selected cell and the reception quality information of the movement destination cell, narrower than a zone in which soft handover control is executed on a data channel enabled to simultaneously communicate in the plurality of cells.

According to this scheme, it follows that a cell switching target in the present invention is selected from soft handover target cells in a data channel enabled to simultaneously communicate in the plurality of cells.

This scheme enables operation efficiency of the whole system to be maintained by diverting the conventional method in a way that avoids adding an extra message and adding setting elements in the respective apparatuses due to application of the present invention.

It should be noted that the present invention may also be a cell switching determination method by which the base station apparatus realizes any one of the functions described above. Further, the present invention may also be a program for making the base station apparatus realize any one of the functions described above.

According to the present invention, it is possible to realize the base station apparatus and the cell switching determination method that prevent the communication throughput from decreasing when performing the cell switching for the mobile terminal.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF THE DRAWINGS

An example in the case where the throughput of the data channel as a whole within the base station gets deteriorated, will hereinafter be described with reference to FIGS. 14, 15 and 16. FIG. 15 is a table illustrating an example of transmission speeds actualized by the respective mobile stations within the cells in a layout depicted in FIG. 14. FIG. 16 is a table illustrating an example of the transmission speeds actualized by the respective mobile stations within the cells after a mobile station A4 has moved.

FIG. 14 illustrates an example in a case where a base station BS1 configures three cells, and a plurality of mobile stations (mobile stations A1-A4 in the cell A, and mobile stations B1-B3 in the cell B) performs the HSDPA communications in each cell. At this time, an assumption is that the mobile stations A1, A2 and A3 exist in positions remote from the base station BS1 and therefore have a poor reception quality of the radio waves from the base station BS1, and another assumption is that the mobile stations B1, B2 and B3 exist in close proximity to the base station BS1 and therefore have a good reception quality of the radio waves from the base station.

In this case, in the case of the poor reception quality, the data is retransmitted frequently on the common channel on which the HSDPA communications are performed, and hence, as illustrated in FIG. 15, the mobile stations A1-A4 have lower throughputs than the terminals B1-B3 have. The example in FIG. 15 is that a total throughput of the HSDPA communications with the respective mobile stations within the cell A is 1 [Mbps], and the total throughput of the HSDPA communications with the respective mobile stations within the cell B is 14 [Mbps] which is a limit value per cell. Namely, it follows that the base station BS1 as a whole actualizes the throughput of 15 [Mbps] into which the throughputs of the cell A and the cell B are totalized.

In this environment, it is presumed that the mobile station A4 moves toward the cell B from the cell A, the CPICH reception quality of the cell B becomes higher than the CPICH reception quality of the cell A, and, though the cell switching in the HSDPA communications is carried out, the mobile station A4 is hard to exit the vicinity of the border between the cell A and the cell B. FIG. 16 illustrates an example of the transmission speeds actualized by the respective mobile stations within each cell in such a case.

In the cell B, a limit value of the throughout per cell has already been reached, and therefore, even when the mobile station A4 moves to the cell B, it does not happen that the total throughput of the cell B exceeds the limit value of 14 [Mbps]. On the other hand, in the cell A, a power resource and a scheduling allocation resource (which are occupied by the mobile station A4) are released because of the mobile station A4 having exited, however, the throughput of each mobile station is not improved due to the poor reception quality. As a result, the throughput of the whole base station immediately after the mobile station A4 has moved to the cell B from the cell A comes to 14.6 [Mbps] as a total of the throughputs of the cell A and the cell B.

Accordingly, the cell switching for the mobile station A4 is carried out, and it follows that the throughput of the whole base station decreases by 400 [kbps]. Namely, if the mobile station moves to the cell B where only the mobile stations having the good communication environment exist from the cell A where only the mobile stations having the poor communication environment exist, it follows that the throughput of the whole base station decreases just after implementing the cell switching in the HSDPA communications.

Figure 1:
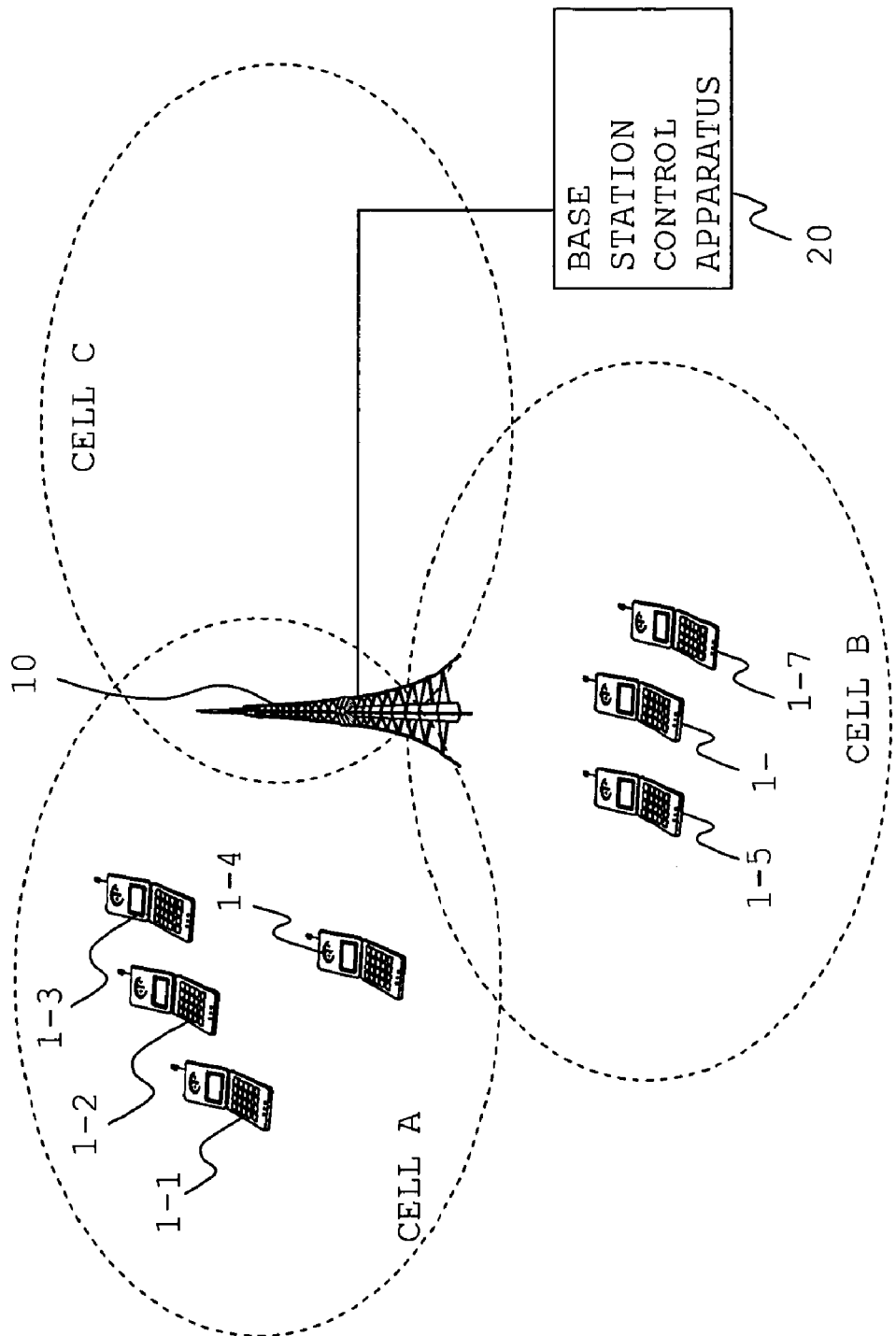
Figure 2:
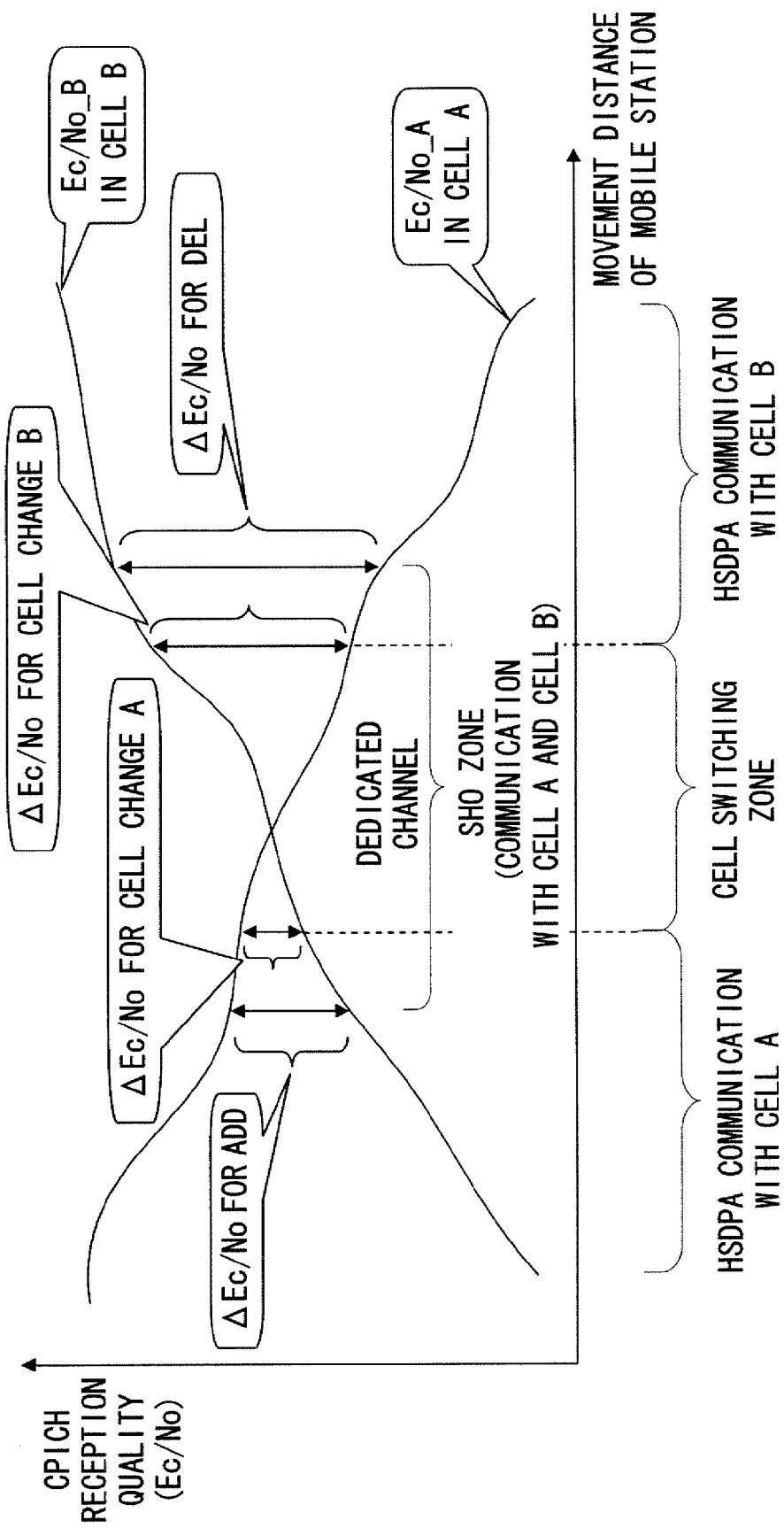
Figure 3:
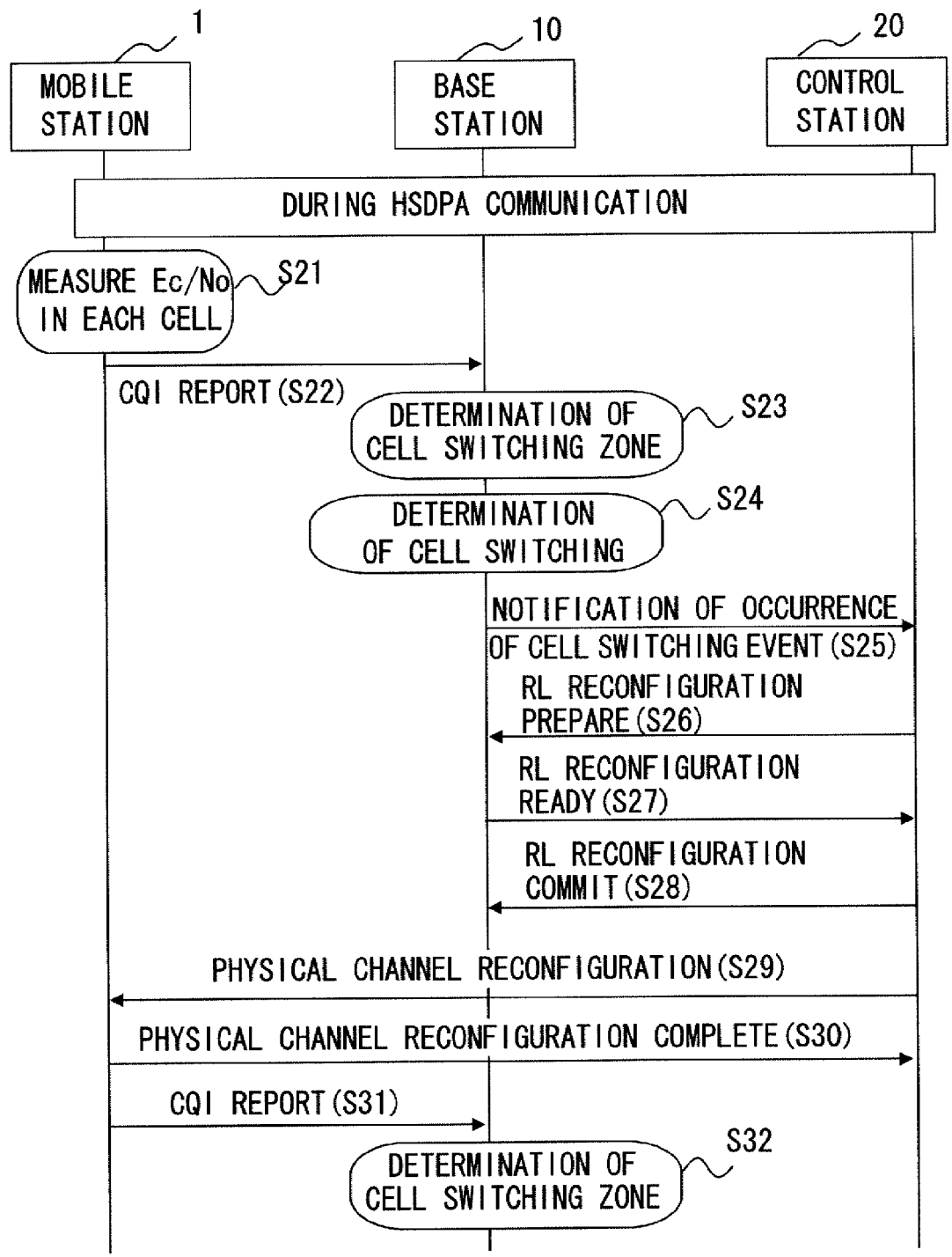
Figure 4:
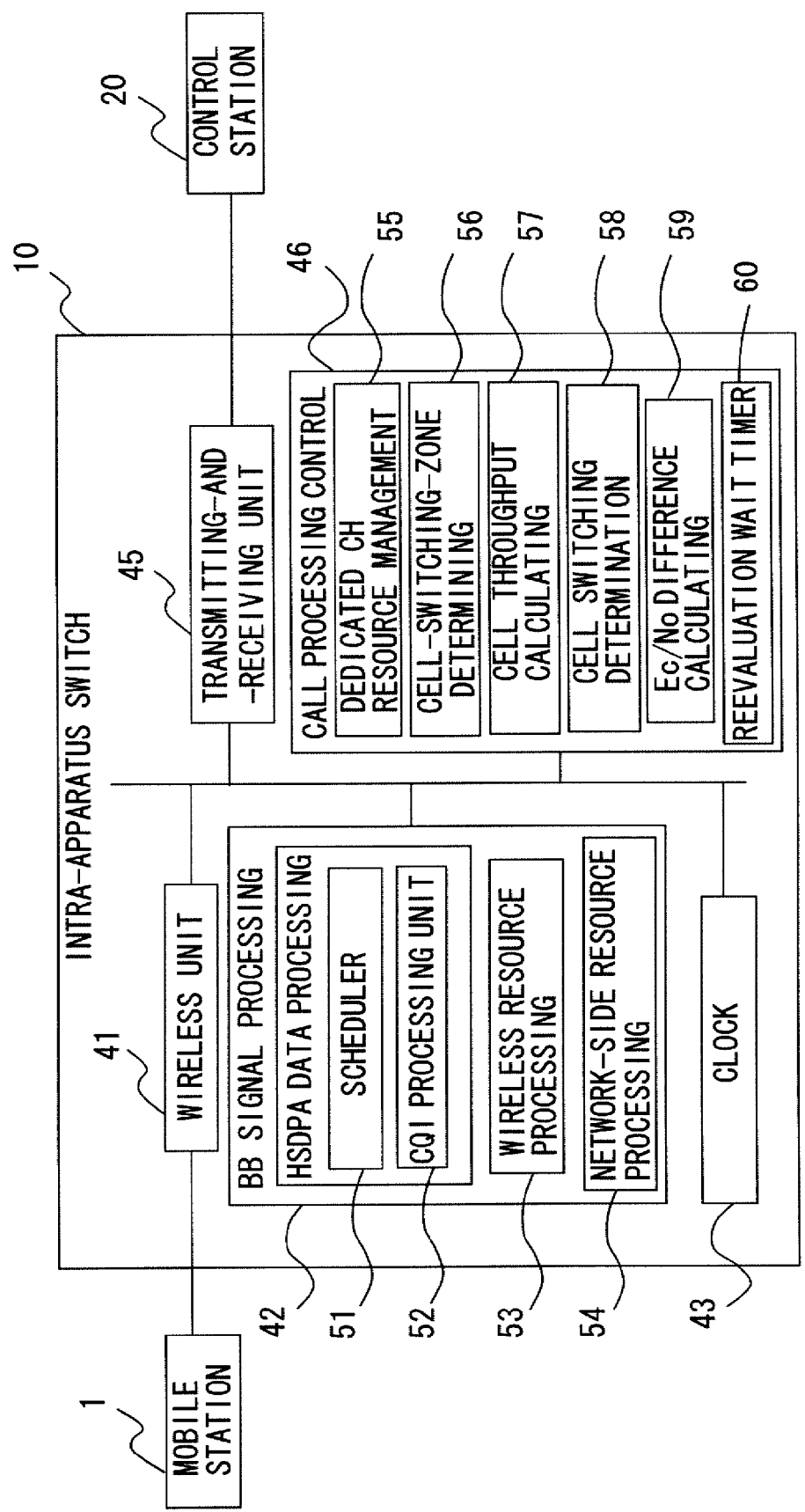
Figure 5:
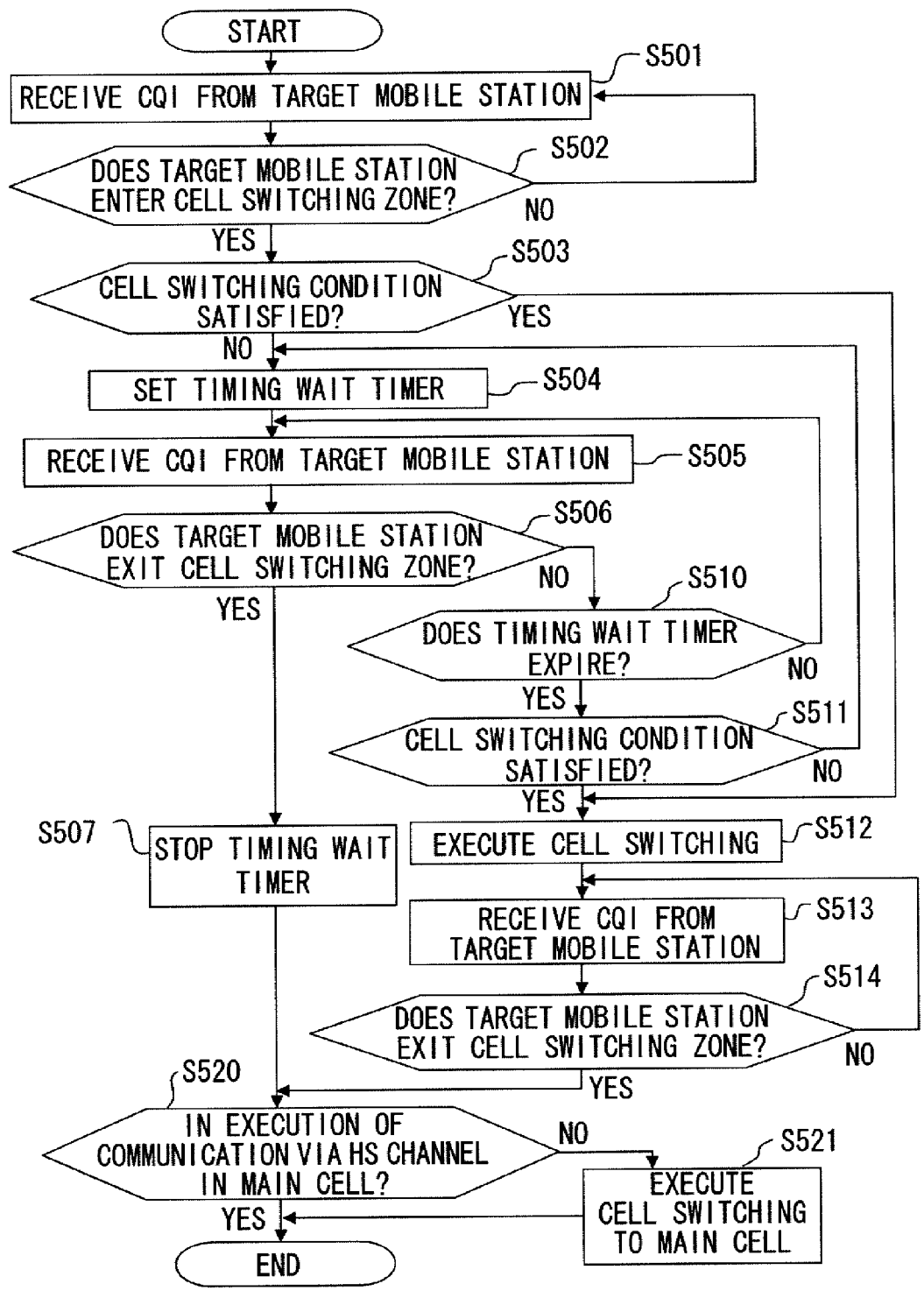
Figure 6:
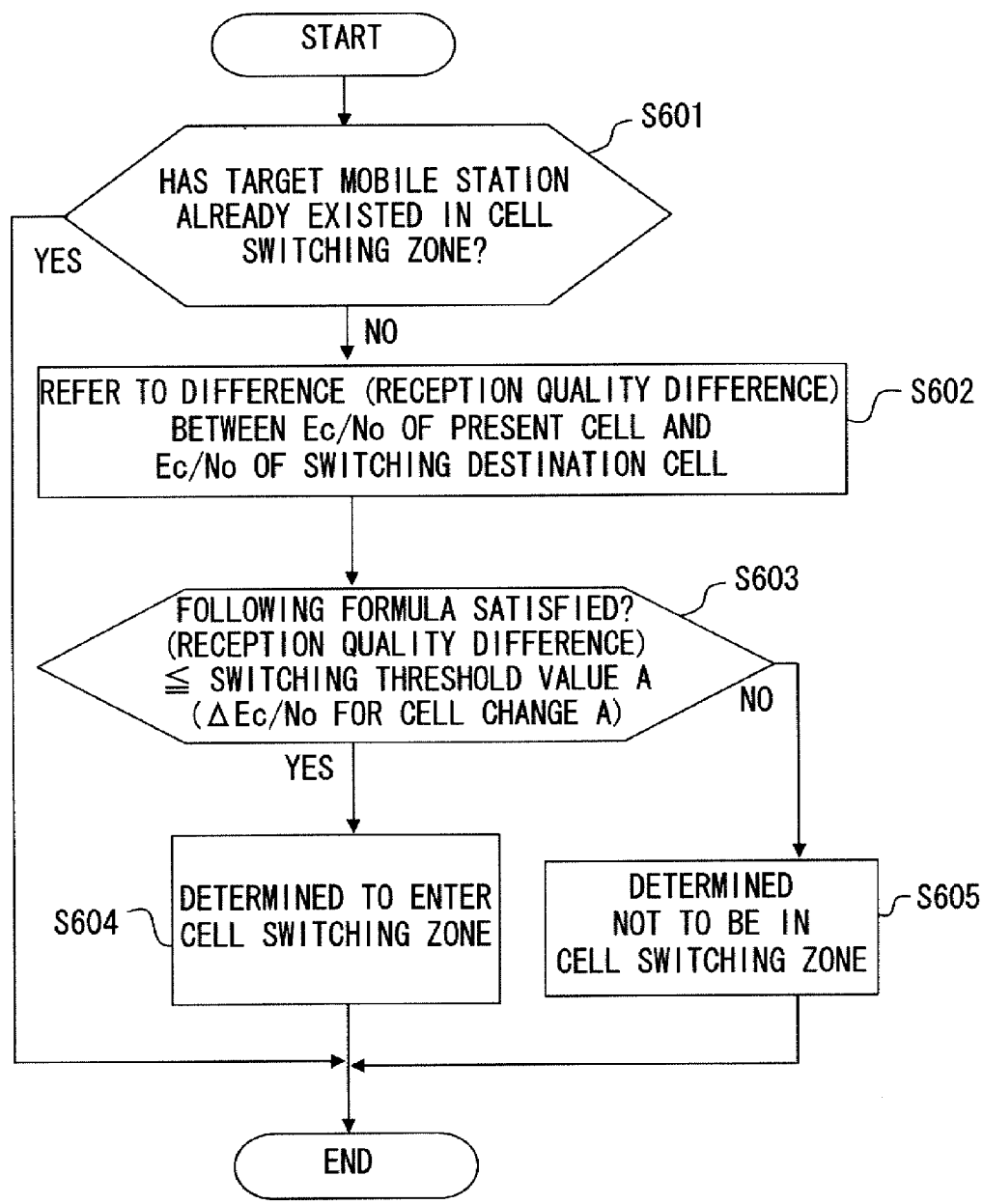
Figure 7:
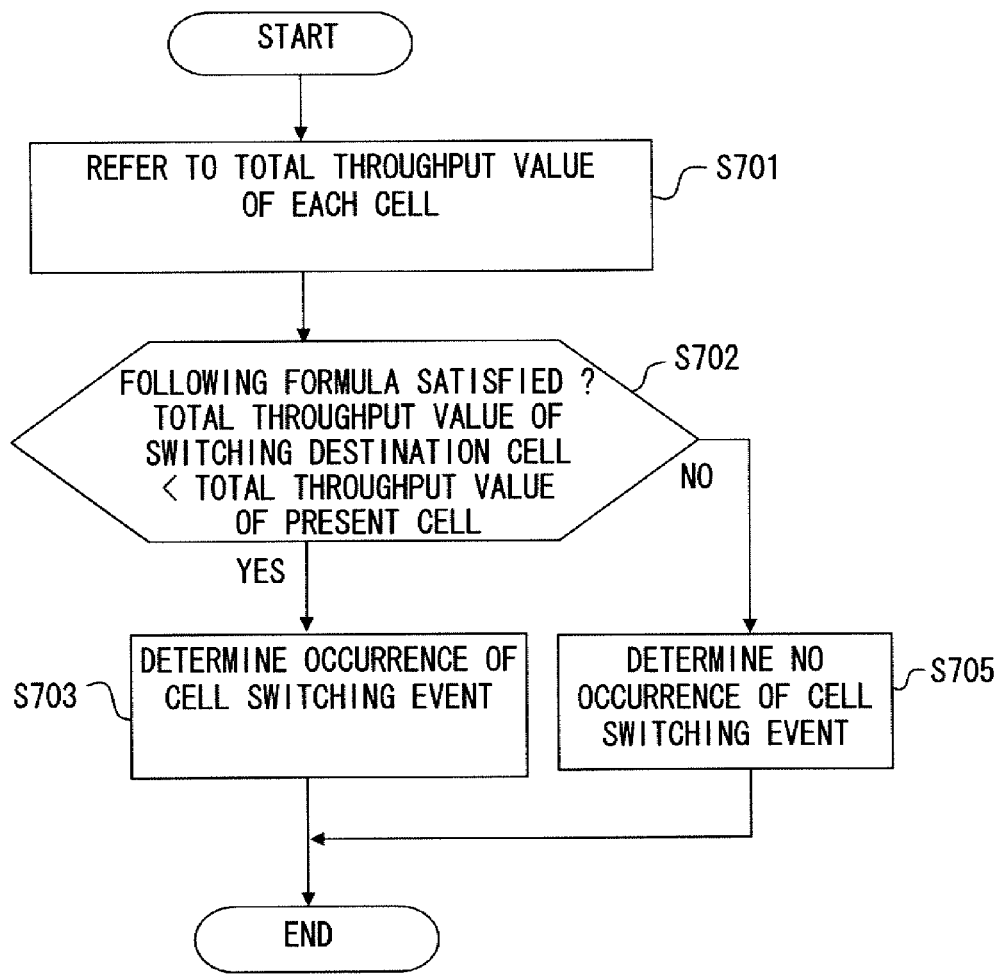
Figure 8:
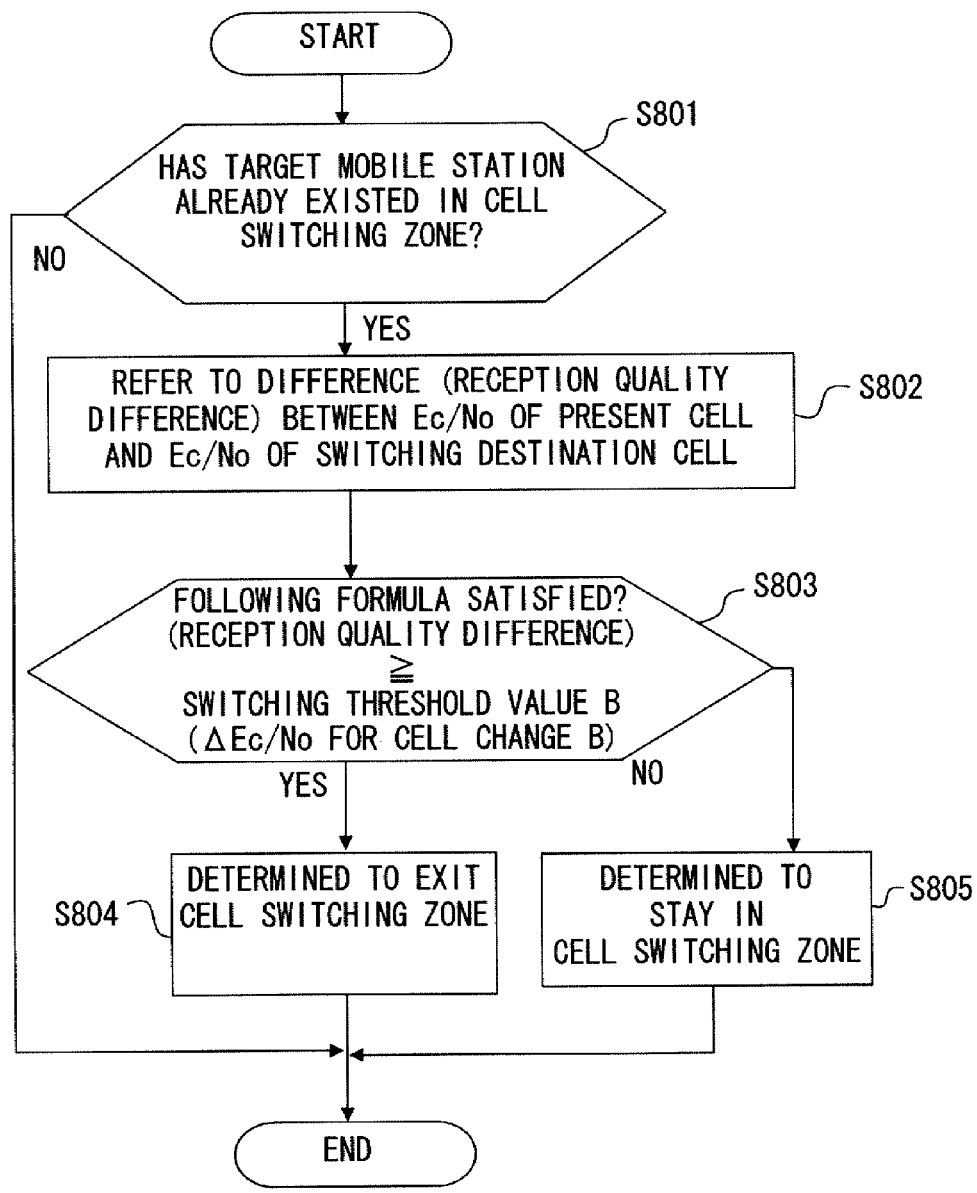
Figure 9:
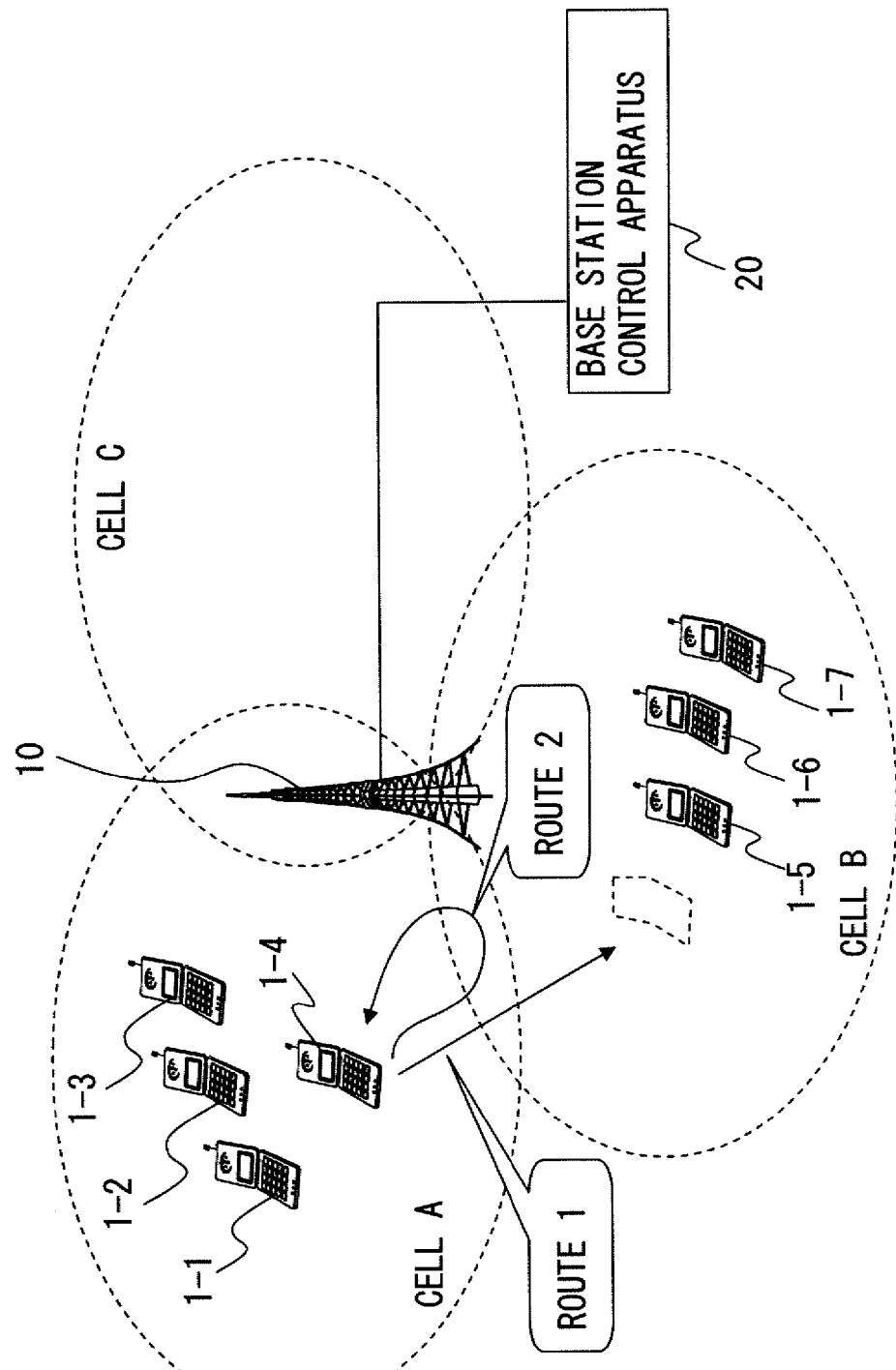
Figure 10:
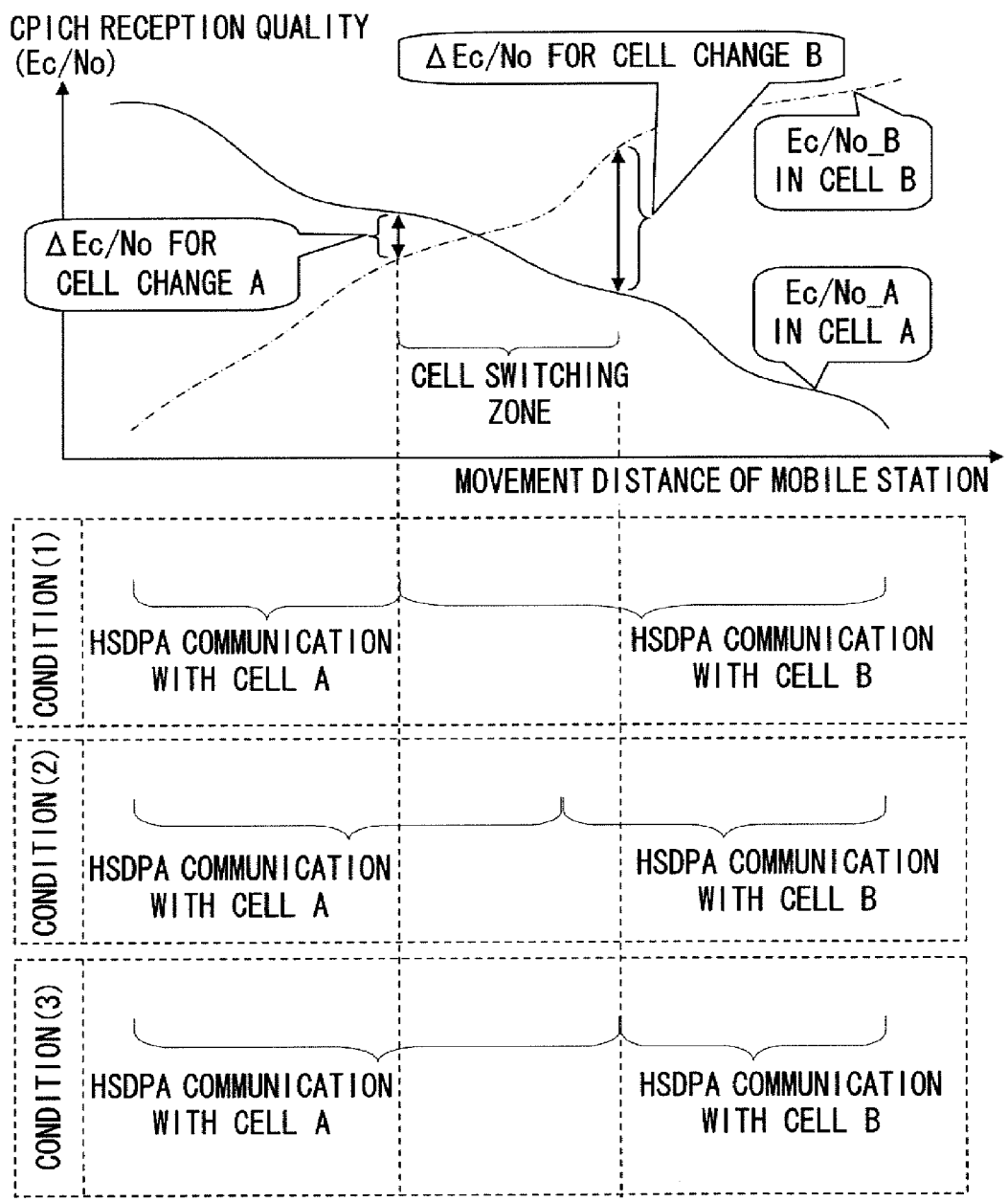
Figure 11:
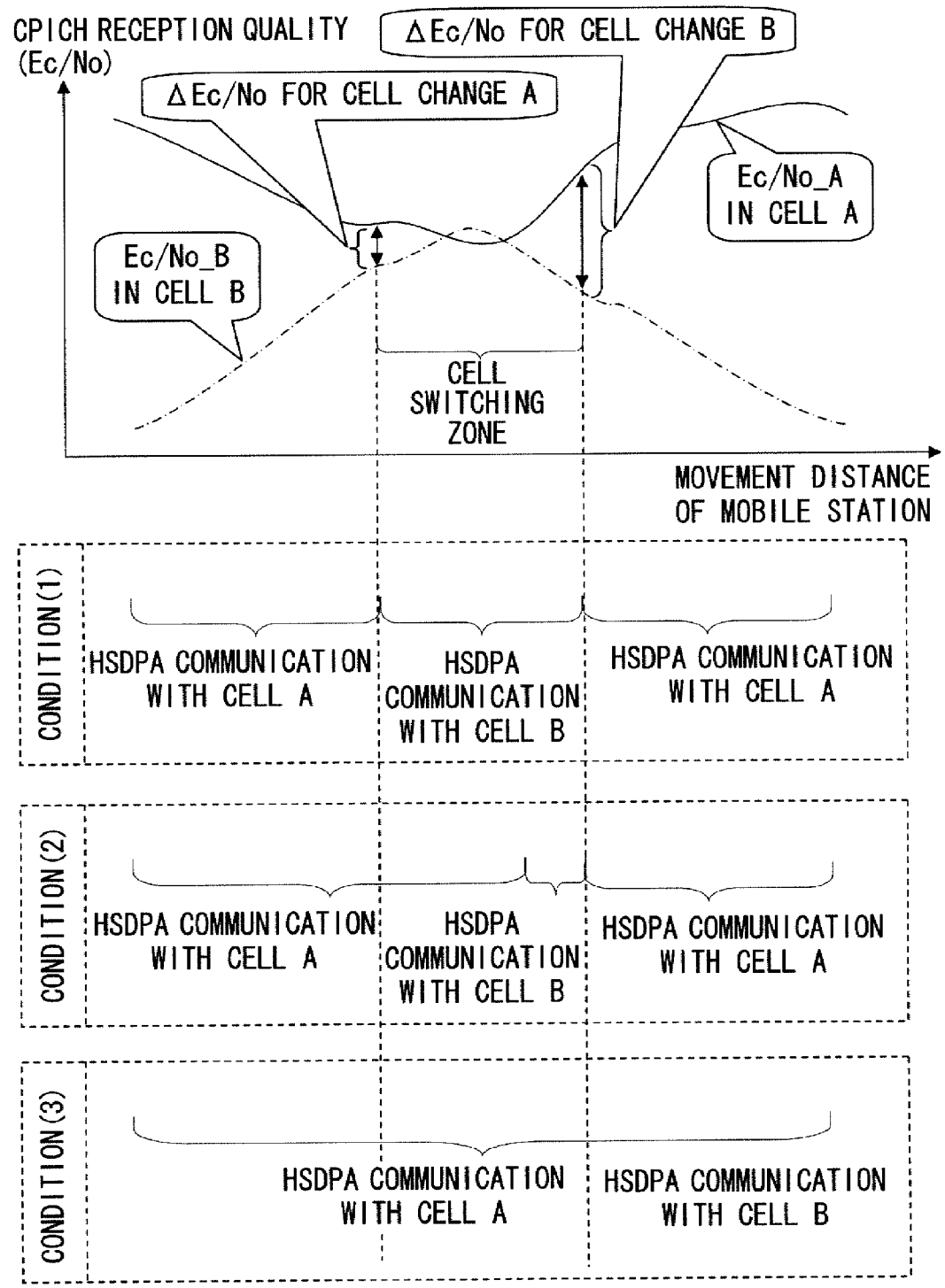
Figure 12:
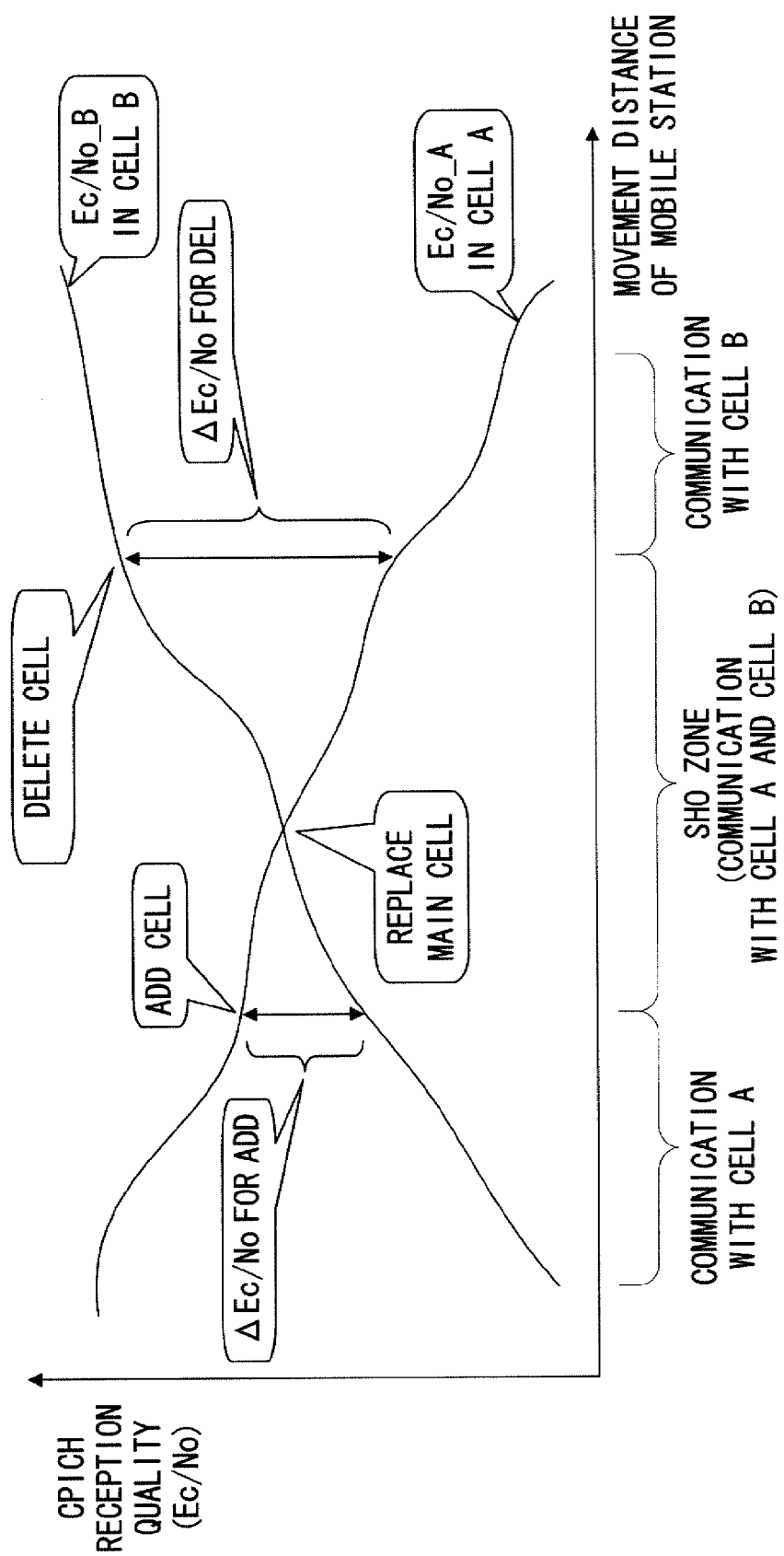
Figure 13:
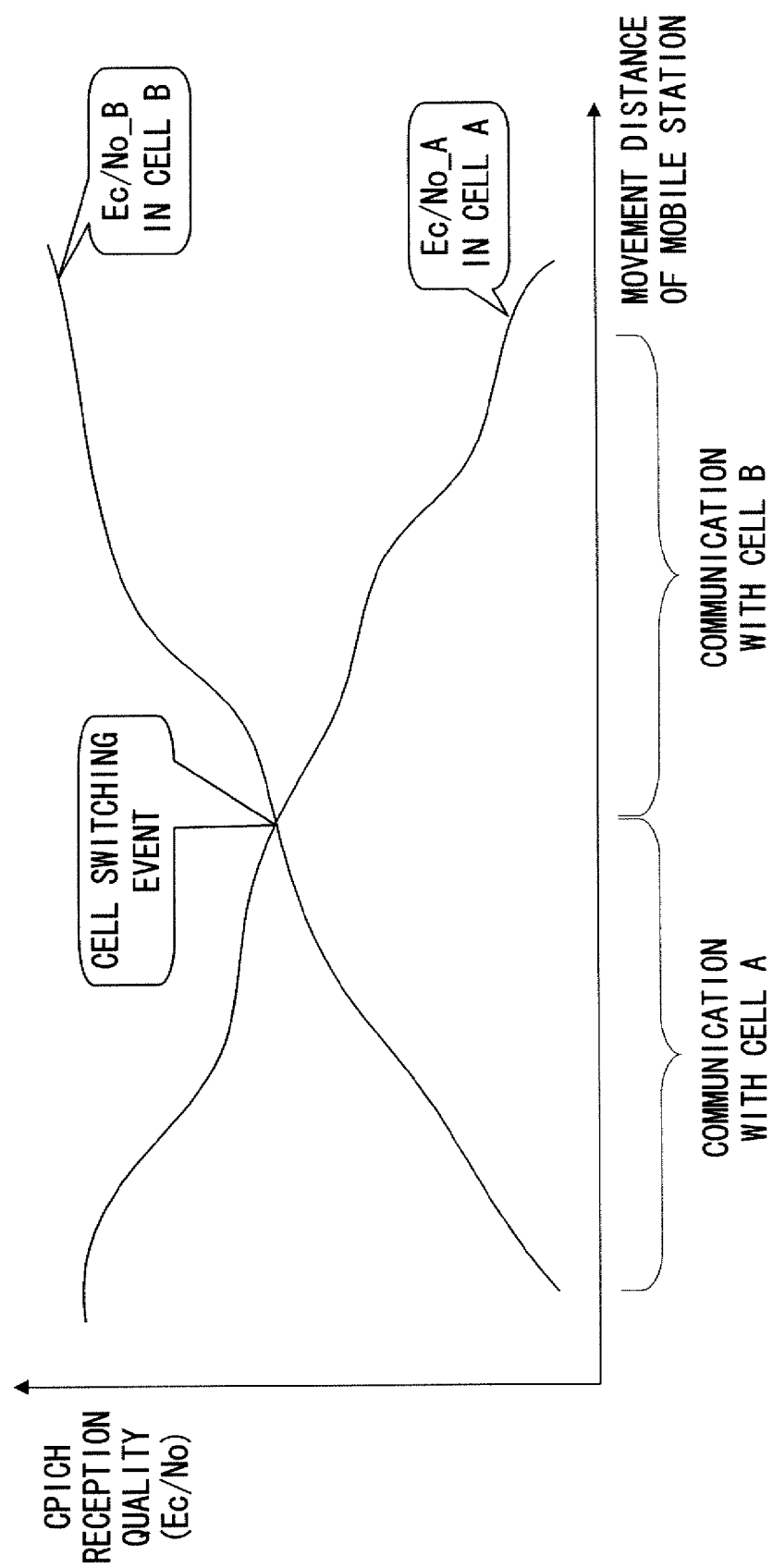
Figure 14:
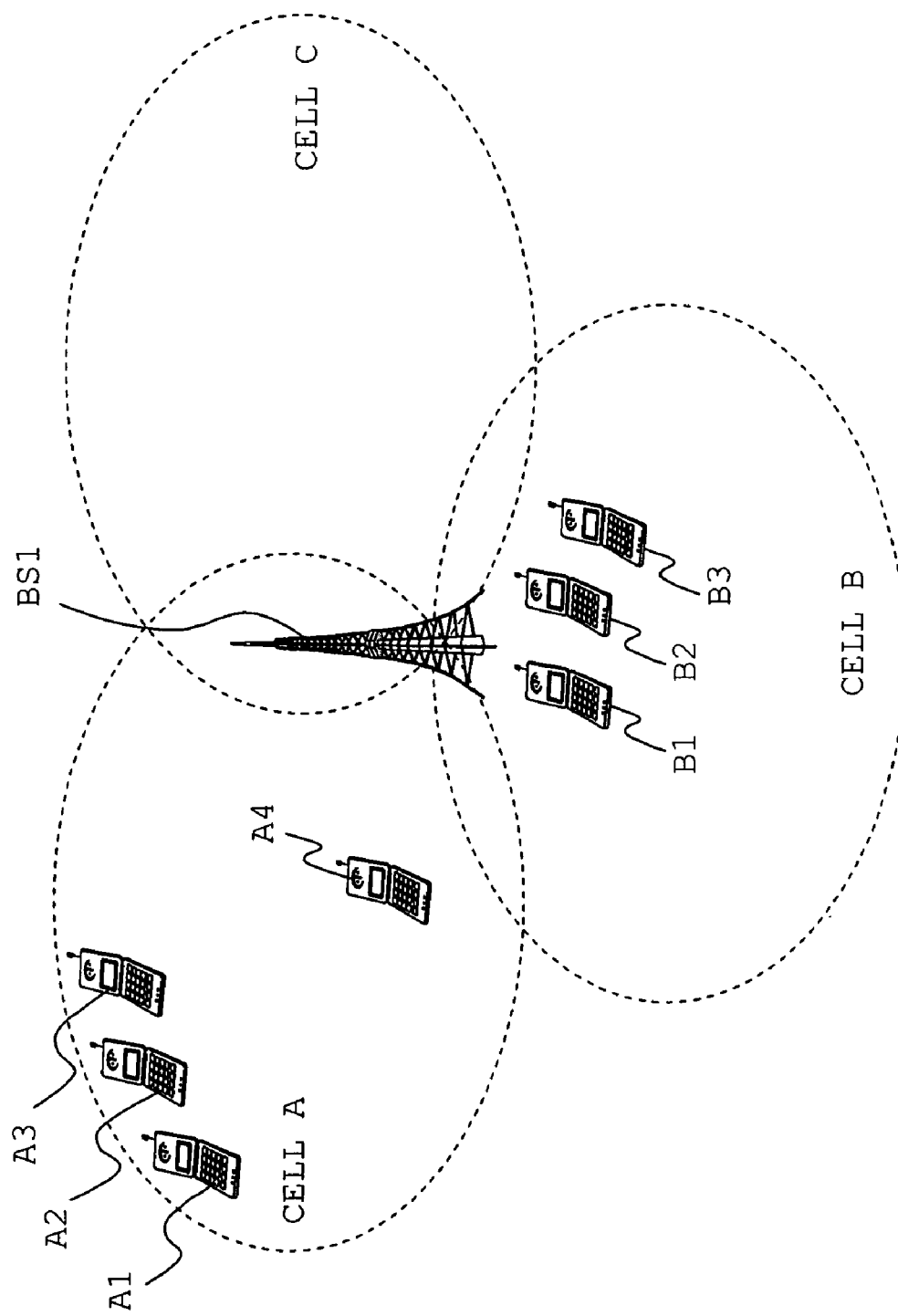
FIG. 14 is a diagram illustrating an example of the communications between the base station and the mobile station.

FIG. 1 is a view illustrating a system architecture of a mobile communication system in the embodiment;

FIG. 2 is a diagram illustrating a switching operation of an HS channel in the embodiment;

FIG. 3 is a sequence diagram illustrating an outline of an operation of the mobile communication system in the embodiment;

FIG. 4 is a block diagram illustrating a configuration of a base station apparatus 10 in the embodiment;

FIG. 5 is a flowchart illustrating an operational example of the mobile communication system in the embodiment;

FIG. 6 is a flowchart illustrating a determining process (S502 in FIG. 5) of determining whether or not a mobile terminal enters a cell switching zone in a cell-switching-zone determining unit;

FIG. 7 is a flowchart illustrating a flow of the cell switching determination process by the cell switching determination unit 58;

FIG. 8 is a flowchart illustrating a determining process (S506 in FIG. 5) of determining whether or not the mobile terminal exits the cell switching zone in the cell-switching-zone determining unit;

FIG. 9 is a diagram illustrating a moving example of mobile stations 1-4;

FIG. 10 is a diagram illustrating a working example of the cell switching in the case of a moving route 1;

FIG. 11 is a diagram illustrating a working example of the cell switching in the case of a moving route 2;

FIG. 12 is a diagram illustrating a concept of a control method with respect to a dedicated data channel when moving to another cell;

FIG. 13 is a diagram illustrating a concept of a control method with respect to a common channel when moving to another cell;

FIG. 14 is a diagram illustrating an example of communications between the base station and the mobile station;

FIG. 15 is a table illustrating an example of communication throughputs actualized by the respective mobile stations within the cells in a layout depicted in FIG. 14; and FIG. 16 is a table illustrating an example of the communication throughputs actualized by the respective mobile stations within the cells after a mobile station A4 has moved.

DESCRIPTION OF EMBODIMENTS

A mobile communication system according to a best mode (which will hereinafter be termed an embodiment) for carrying out the present invention will hereinafter be described with reference to the drawings. A configuration in the following embodiment is an exemplification, and the present invention is not limited to the configuration in the following embodiment.

Embodiment

The mobile communication system in the embodiment of the present invention will hereinafter be discussed with reference to the drawings.

[System Architecture]

To begin with, a system architecture of the mobile communication system in the embodiment will hereinafter be described with reference to FIG. 1. FIG. 1 is a view illustrating the system architecture of the mobile communication system in the embodiment. The mobile communication system in the embodiment includes a base station apparatus (which will hereinafter also be simply referred to as a base station) 10 and a base station control apparatus (which will hereinafter also be simply referred to as a control station) 20 which controls a plurality of base stations including the base station 10. The base station 10 configures a cell A, a cell B and a cell C by use of a directional antenna etc. The mobile communication system in the embodiment provides predetermined communication services to a plurality of mobile terminals (which will hereinafter also be simply referred to as mobile stations) 1-1 through 1-7 connected to the mobile communication system by performing wireless communications with the base station 10. An example in FIG. 1 is that the mobile stations 1-1 through 1-4 exist in the cell A, and the mobile stations 1-5 through 1-7 exist in the cell B. Note that in the following discussion, the mobile stations are generically termed the mobile station 1 in the case of describing contents common to the mobile stations.

Downlink user data is transferred and received between the base station 10 and the mobile station 1 by use of a dedicated data channel (DCH) and an HSDPA common channel (HS-PDSCH) (which will hereinafter also be termed an HS channel). As described in the section [Background Art], the dedicated data channel is the simultaneously-communication-enabled data channel in the plurality of cells, while the HS channel is the communication-enabled data channel only in the single cell. The present invention is the invention related to the communication-enabled data channel only in the single cell as in the case of this HS channel, and hence the following discussion shall be made in a way that specializes functions related to the communications using this HS channel. Note that the present invention does not limit the communication-enabled data channel only in the single cell to the HS channel. Further, the present invention does not apply any restrictions to other dedicated data channels.

[Outline of System Operation]

Herein, an outline of an operation of the mobile communication system in the embodiment will hereinafter be described with reference to FIGS. 2 and 3. FIG. 2 is a diagram illustrating a switching operation of the HS channel in the embodiment. FIG. 3 is a sequence diagram illustrating an outline of the operation of the mobile communication system in the embodiment.

As depicted in FIG. 2, cell switching control of the mobile communication system in the embodiment provides a cell switching zone also about the HS channel as in the case of an SHO zone of the dedicated data channel. This cell switching zone shall range from occurrence of a cell switching event A to occurrence of a cell switching event B. The cell switching event A occurs when a difference between Ec/No of the present (pre-switching) cell and Ec/No of the switching destination cell becomes equal to or smaller than a switching threshold value A ([ΔEc/No FOR CELL CHANGE A] illustrated in FIG. 2). This predetermined switching threshold value A is set to, e.g., 2 [dB] as a value obtained by subtracting 1[dB] from an additional threshold value ([ΔEc/No FOR ADD] illustrated in FIG. 2) used for deciding the SHO zone. The cell switching event B occurs when the difference between Ec/No of the present cell and Ec/No of the switching destination cell becomes equal to or larger than a predetermined switching threshold value B ([ΔEc/No FOR CELL CHANGE B] illustrated in FIG. 2). This predetermined switching threshold value B is set to, e.g., 8 [dB] as a value obtained by subtracting 1 [dB] from a delete threshold value ([ΔEc/No FOR DEL] illustrated in FIG. 2) used for deciding the SHO zone.

Thus, the cell switching zone is set shorter than the SHO zone in the dedicated data channel. This is because of keeping operation efficiency of the whole system by diverting the conventional method in a way that avoids adding an extra message and adding setup elements of the respective apparatuses due to the application of the present invention. In the embodiment also, as will be stated later on, a cell switching execution sequence from notification of the occurrence of the cell switching event (S25) adopts the same method as the conventional method. Then, the conventional mobile station and the conventional base station, which execute this conventional method, make an HS channel setup preparation for carrying out the switching to a soft handover target cell of the dedicated data channel as a movement destination cell. Accordingly, a scheme in the case of trying the cell switching of the HS channel to a soft-handover-unimplemented cell, it follows, further transferring and receiving the extra message and setting in the respective apparatuses in addition to the conventional method. This being the case, a scheme under the cell switching control of the HS channel of the mobile communication system is also such that the switching target cell is selected from within the cells accepting the soft handover of the dedicated data channel other than the HS channel.

The mobile communication system in the embodiment operates as depicted in FIG. 3 by employing the thus-defined cell switching zone.

When a wireless link between the mobile station 1 and the base station 10 is established, the HSDPA communications are executed via the predetermined HS channel allocated by the control station 20 etc. The mobile station always measures a reception quality (e.g., Ec/No) of CPICH with respect to each of the present cell and neighboring cells (S21). The mobile station 1 generates, based on the measured Ec/No, a CQI (Channel Quality Indicator) with respect to each of the cells, and reports each CQI to the base station 10 (S22). Note that the CQI is reported as the information indicating the reception quality of each cell in FIG. 3, however, the present invention does not limit this type of information. The mobile station 1 may also report the measured reception quality (Ec/No) to the base station 10. FIG. 2 illustrates an example in which the cell switching zone is determined based on an Ec/No difference.

The base station 10 determines, based on each CQI reported from the mobile station 1, the cell switching zone about the mobile station 1 (S23). To be specific, the base station 10 estimates the Ec/No of each cell from the CQI of each cell, and compares the Ec/No difference between the cells with switching threshold values A and B. The base station 10 determines from a result of this comparison whether the mobile station 1 belongs to the cell switching zone or not, and decides whether the occurrence of the cell switching event A or B is required or not (S24).

The base station 10, when deciding that the mobile station 1 requires the occurrence of the cell switching event, notifies the control station 20 of the occurrence of the cell switching event (S25). Hereafter, the cell switching execution sequence (from S25 to S30) conducted among the control station 20, the base station 10 and the mobile station 1 is the same as the conventional method, and hence its description is omitted herein.

[Apparatus Configuration]

Each of the apparatuses configuring the mobile communication system in the embodiment in order to realize the system operation described above, will hereinafter be described with reference to the drawings.

<Base Station Apparatus>

FIG. 4 is a block diagram illustrating a configuration of the base station apparatus 10. Respective function units of the base station 10 depicted in FIG. 4 may be realized by hardware circuits and may also be realized in such a way that a control program stored in a memory is loaded into a CPU (Central Processing Unit) and executed by the CPU.

The base station 10 includes, as illustrated in FIG. 4, a wireless unit 41 which processes wireless communications with the mobile station 1, a baseband (which will hereinafter be abbreviated to BB) signal processing unit 42, a clock oscillation unit 43, a transmitting-and-receiving unit 45 which processes the communications with the control station 20, a call processing control unit 46, etc. The base station 10 further includes an antenna (unillustrated) that receives the signals from the mobile station 1 and transmits the signals to the mobile station 1. Moreover, the base station 10 is connected to the control station 20 via a predetermined (wired or wireless) network.

The wireless unit 41, which is connected to the antenna, processes the signals that are to be transmitted from the antenna and the signals received from the antenna. The wireless unit 41 converts BB signals transmitted from the BB signal processing unit 42 into radio signals, and transmits the radio signals to the antenna. Further, the wireless unit 41 converts the radio signals received from the antenna into the BB signals, and transmits the BB signals to the BB signal processing unit 42.

The BB signal processing unit 42 includes a scheduler 51, a CQI processing unit 52, a wireless resource processing unit 53, a network-side resource processing unit 54, etc. The wireless resource processing unit 53 maps data for an individual user to the wireless resource determined by the scheduler 51. The network-side resource processing unit 54 manages communication resources for transmitting, to the control station 20, the data sent from the respective mobile stations 1. A result of the control by the network-side resource processing unit 54 is sent to the transmitting-and-receiving unit 45.

The scheduler 51 and the CQI processing unit 52 build up an HSDPA data processing unit, and process the data about the HSDPA.

The scheduler 51 determines the wireless resources that should be allocated to the transmission signals for the individual users and the wireless resources etc that are allocated to other broadcast signals etc. At this time, the scheduler 51 calculates a communication throughput (transmission rate) of each mobile station. The scheduler 51 has heretofore implemented allocation of frequencies based on the communication throughput of each mobile station. A scheme in the embodiment is that the scheduler 51 calculates the communication throughput of each mobile station, and transmits the thus-calculated communication throughput of each mobile station to the call processing control unit 46. The call processing control unit 46 utilizes the communication throughput of each mobile station for deciding the occurrence of the cell switching event.

The CQI processing unit 52 accepts a CQI report from each mobile station 1, and sequentially transmits the CQI report in a status of being associated with each mobile station 1 to the call processing control unit 46.

The transmitting-and-receiving unit 45 processes the data transmitted to and received from the control station 20. The transmitting-and-receiving unit 45 sends a message (S25) for notifying of the occurrence of the cell switching event illustrated in FIG. 3 to the network on the side of the control station 20. Further, the transmitting-and-receiving unit 45 receives respective messages (S26, S28, etc in FIG. 3) for carrying out the cell switching from the network on the side of the control station 20.

The call processing control unit 46 controls a call related to each mobile station 1. The call processing control unit 46 includes an dedicated data channel resource management unit 55, a cell-switching-zone determining unit 56, a cell throughput calculating unit 57, a cell switching determination unit 58, a reception-quality-difference calculating unit 59, a reevaluation wait timer 60, etc.

The dedicated data channel resource management unit 55 controls the call via the dedicated data channel. To be specific, the dedicated data channel resource management unit 55 carries out the cell switching control using the SHO zone with respect to the dedicated data channel. This control is as described in the paragraph [Background Art], and therefore its explanation is herein omitted.

The functions units other than the dedicated data channel resource management unit 55 will hereinafter be described in a way that specializes the control function about the HS channel.

The reception-quality-difference calculating unit 59 receives the CQI, sent from the CQI processing unit 52, about each cell for each mobile station, and calculates a reception quality difference ($\Delta Ec/No$) on the basis of the CQI of the cell (present cell) in which the mobile station now exists and the CQI (the CQI of the switching destination cell) of the cell serving as the switching destination cell. Specifically, the reception-quality-difference calculating unit 59 estimates the Ec/No of the present cell from the CQI of the present cell, estimates the Ec/No of the switching destination cell from the CQI of the switching destination cell, and calculates a difference between these Ec/No values as a reception quality difference. Note that the reception-quality-difference calculating unit 59 may also calculate a difference between the CQI of the present cell and the CQI of the switching destination cell as the reception quality difference.

The cell-switching-zone determining unit 56 determines, by use of the differences between the reception qualities of the respective mobile stations that are calculated by the reception-quality-difference calculating unit 59, whether or not each mobile station belongs to the cell switching zone. Specifically, the cell-switching-zone determining unit 56, if the target mobile station 1 exists outside the cell switching zone and if the reception quality difference value falls within a predetermined switching threshold value A ([$\Delta Ec/No$ FOR CELL CHANGE A] illustrated in FIG. 2), determines that this mobile station enters the cell switching zone. Conversely, the cell-switching-zone determining unit 56, if the target mobile station 1 exists within the cell switching zone and if the reception quality difference value becomes equal to or larger than a predetermined switching threshold value B ([$\Delta Ec/No$ FOR CELL CHANGE B] illustrated in FIG. 2), determines that this mobile station exits the cell switching zone.

The cell-switching-zone determining unit 56 may always retain a flag indicating whether each mobile station belongs the cell switching zone or not. Further, the switching threshold value A and the switching threshold value B are adjustably retained the memory etc.

The cell throughput calculating unit 57 adds up the communication throughput values on a cell basis, which are sent from the scheduler 51 and realized by the respective mobile stations, and calculates a total communication throughput value on the cell basis. The cell throughput calculating unit 57 may calculate the total value of the communication throughputs at a predetermined measurement time interval (e.g., 3 sec) irrespective of whether there is the call or not, and may retain the result of the calculation.

The cell switching determination unit 58 is the function unit for realizing, within the base station apparatus, the cell switching determination heretofore made by within the control station. The cell switching determination unit 58 determines the occurrence of the cell switching event of each mobile station by use of the result of the determination made by the cell-switching-zone determining unit 56 and the total communication throughput value of the respective cells, which are calculated by the cell throughput calculating unit 57. To be specific, the cell switching determination unit 58, when the cell-switching-zone determining unit 56 determines that the target mobile station belongs to the cell switching zone, further determines whether or not the total communication throughput value of the switching destination cell is smaller than the total communication throughput value of the present cell (a cell switching condition). The cell switching determination unit 58, when determining that the total communication throughput value of the switching destination cell is smaller than the total communication throughput value of the present cell (when determining that the cell switching condition is satisfied), decides that the cell switching event occurs. The cell switching determination unit 58, when deciding that the cell switching event occurs, instructs the transmitting-and-receiving unit 45 to transmit a message for notifying of the occurrence of the cell switching event illustrated in FIG. 3 to the control station 20.

The reevaluation wait timer 60 is, if it is determined that the cell switching condition is not satisfied, used for keeping a predetermined period for judging again this cell switching condition. The predetermined period set in the reevaluation wait timer 60 may also be adjustably retained in the memory etc.

<Control Station Apparatus>

In the control station apparatus 20, a handover management unit (unillustrated) etc has heretofore decided the cell switching of the HS channel. The execution of the cell switching process in the control station apparatus 20 is leaded by receiving a cell switching event occurrence notifying message from the base station apparatus 10. With this scheme, the control station apparatus 20 in the embodiment has no necessity for executing the cell switching deciding process which involves using the CPICH reception quality (e.g., Ec/No) given from each mobile station as heretofore done. Note that the cell switching performing process (S26 through S30 in FIG. 3) by the control station apparatus 20 is the same as done by the conventional technique, and hence the description thereof is herein omitted.

<Mobile Terminal Apparatus>

The mobile terminal apparatus 1 has an HSDPA communication function. Further, the mobile terminal apparatus 1 has a function of measuring the CPICH reception quality (e.g., Ec/No) with respect to each of the cell where the mobile station now exists and the neighboring cells, and a function of generating the CQI about each cell. These functions are the same as those of the conventional technique, and therefore the descriptions thereof are herein omitted. The present invention does not limit things other than the functions which will hereinafter be described.

The decision about the cell switching has heretofore been made by the control station apparatus 20, and hence the Ec/No of each cell, which was measured by the mobile station 1, was reported by way of a Measurement Report message on an RRC (Radio Resource Control) layer to the control station apparatus 20 via the base station 10. Further, the CQI utilized for the HSDPA communications was reported to the base station 10 at an interval of, e.g., 2 msec in a way that sets only the CQI of the in-communication cell in a predetermined field of HS-DPCCH (Dedicated Physical Control Channel (uplink) for HS-DSCH).

The mobile terminal apparatus 1 in the embodiment reports also the CQIs of the neighboring cells in addition to the present cell to the base station 10. A report method may involve using a predetermined field of HS-DPCCH and providing a new dedicated field. In the case of using the predetermined field of the HS-DPCCH, the CQI of the present cell and the CQIs of the neighboring cells may be alternately set. Further, the CQI may also be reported via a channel other than the HS-DPCCH.

Operational Example

An operational example of the mobile communication system in the embodiment will hereinafter be described with reference to FIG. 5. FIG. 5 is a flowchart illustrating the operational example of the mobile communication system in the embodiment.

The mobile station 1 transmits, while moving, the CQI of the cell A, the CQI of the cell B and the CQI of the cell C respectively to the base station 10 (S501).

The base station 10, when receiving the CQI of each cell from the mobile station 1, determines whether or not the mobile station 1 enters the cell switching zone (the cell-switching-zone determining unit 56) (S502). When determining that the mobile station 1 exists outside the cell switching zone (S502; NO), the base station 10 loops back to the process in S501 without switching the cell.

FIG. 6 is a flowchart illustrating a determining process by the cell-switching-zone determining unit 56 about whether or not the mobile station 1 enters the cell switching zone (S502 in FIG. 5). In the base station 10, when receiving the CQIs of the respective cells from the mobile station 1, the reception-quality-difference calculating unit 59 calculates the reception quality difference ($\Delta$Ec/No) based on the CQI of the present cell of the mobile station 1 and the CQI of the switching destination cell.

The cell-switching-zone determining unit 56 judges whether or not the mobile station 1 has already existed in the cell switching zone (S601). This judgment may use, e.g., a flag that is set when judging that the mobile station 1 exists in the cell switching zone but is canceled when deciding that the mobile station 1 exits the cell switching zone. The cell-switching-zone determining unit 56, when confirming that the mobile station 1 has already existed within the cell switching zone (S601; NO), refers to the reception quality difference value calculated by the reception-quality-difference calculating unit 59 (S602), and thus determines whether or not the reception quality difference value becomes equal to or smaller than the switching threshold value A (S603).

The cell-switching-zone determining unit 56, when determining that the reception quality difference value becomes equal to or smaller than the switching threshold value A (S603; YES), decides that the mobile station 1 enters the cell switching zone (S604). While on the other hand, the cell-switching-zone determining unit 56, when determining that the reception quality difference value is larger than the switching threshold value A (S603; NO), decides that the mobile station 1 exists outside the cell switching zone (S605).

It is determined in the cell switching zone determining process that the mobile station 1 enters the cell switching zone (S502; YES), at which time the base station 10 judges whether or not the cell switching condition is satisfied (the cell switching determination unit 58) (S503).

FIG. 7 is a flowchart illustrating a flow of the cell switching determination process by the cell switching determination unit 58. The cell switching determination unit 58, as judging whether the cell switching condition is satisfied or not, refers to the total communication throughput value of the respective cells, which are calculated by the cell throughput calculating unit 57 (S701). At this time, the cell switching determination unit 58 refers to the total communication throughput value of the two cells becoming the cell switching zone target cells.

The cell switching determination unit 58 determines whether or not the total communication throughput value of the switching destination cell is smaller than the total value of the throughputs of the present cell (S702). The cell switching determination unit 58, when deciding that the total value of the throughputs of the switching destination cell is smaller than the total value of the throughputs of the present cell (S702; YES), determines the occurrence of the cell switching event (the cell switching condition is satisfied (S503; YES)) (S703). The cell switching determination unit 58, when deciding that the total value of the throughputs of the switching destination cell is equal to or larger than the total value of the throughputs of the present cell (S702; NO), determines that the cell switching event does not occur (the cell switching condition is not satisfied (S503; NO)) (S705).

The cell switching determination unit 58, when determining that the cell switching condition is satisfied (S503; YES), executes the cell switching process (S512). The cell switching determination unit 58 instructs the transmitting-and-receiving unit 45 to transmit the message of notifying of the occurrence of the cell switching event to the control station 20. Hereafter, the cell switching operation process (S26 through S30 in FIG. 3) of the HS channel is executed among the control station 20, the base station 10 and the mobile station 1.

When the cell switching of the mobile station 1 existing within the cell switching zone is carried out, the base station 10 shifts to an operation mode for determining whether the mobile station 1 exits the cell switching zone or not (S513, S514).

On the other hand, if it is determined that the mobile station 1 enters the cell switching zone and that the cell switching condition is not satisfied (S503; NO), the reevaluation wait timer for taking the timing for reevaluating the cell switching condition is set up (S504). When the reevaluation wait timer is set up, the base station 10 shifts to an operation mode for determining whether the mobile station 1 exits the cell switching zone or not (S505, S506).

FIG. 8 is a flowchart illustrating a determining process in which the cell-switching-zone determining unit 56 determines whether the mobile station 1 exits the cell switching zone or not (S506 and S514 in FIG. 5). At this time, in the base station 10, the reception quality difference (ΔEc/No) is calculated based on the CQIs of the respective cells, which are sent from the mobile station 1.

The cell-switching-zone determining unit 56 judges whether the mobile station 1 has already entered the cell switching zone or not (S801). The cell-switching-zone determining unit 56, upon confirming that the mobile station 1 has already existed in the cell switching zone (S801; YES), refers to the reception quality difference value calculated by the reception-quality-difference calculating unit 59 (S802), and determines whether or not the reception quality difference value is equal to or larger than the switching threshold value B (S803).

The cell-switching-zone determining unit 56, when determining that the reception quality difference value becomes equal to or larger than the switching threshold value B (S803; YES), decides that the mobile station 1 exits the cell switching zone (S804). While on the other hand, the cell-switching-zone determining unit 56, when determining that the reception quality difference value is smaller than the switching threshold value B (S803; NO), decides that the mobile station 1 stays in the cell switching zone (S805).

The cell switching determination unit 58, if it is determined that the mobile station 1 enters the cell switching zone but still stays in the cell switching zone while the cell switching condition is not satisfied (S506; NO), again determines, when the reevaluation wait timer expires (S510; YES), whether or not the mobile station 1 satisfies the cell switching condition (S511). Herein, when determining that the cell switching condition is not yet satisfied (S511; NO), the reevaluation wait timer is again set up (S504), and the base station 10 shifts to an operation mode for deciding whether or not the mobile station 1 exits the cell switching zone or not (S505, S506).

When the cell-switching-zone determining unit 56 determines that the mobile station 1 exits the cell switching zone (S506; YES, S514; YES), if the reevaluation wait timer is set (S507), the judgment whether or not the communication via HS channel is in execution in a main cell (S520) after stopping the timer (S507). Herein, the main cell represents the cell offering the highest reception quality in the CQIs of the respective cells, which are reported from the mobile station 1.

The cell switching determination unit 58, in the case of deciding that the mobile station 1 exits the cell switching zone (S506; YES, S514; YES) and when confirming that the mobile station 1 is during transmission via the HS channel in the main cell (S520; YES), terminates the process directly without switching over the cell (loops back to S501). While on the other hand, the cell switching determination unit 58, when confirming that the mobile station 1 is not during transmission via the HS channel in the main cell (S520; NO), switches over the cell to the main cell (S521). Details of this cell switching process are the same as in S512.

<Working Example of Cell Switching>

An example, in which the mobile communication system in the embodiment performs the cell switching in such a case that the mobile stations 1-4 move along moving routes 1 and 2 as depicted in FIG. 9, will hereinafter be explained with reference to FIGS. 10 and 11. FIG. 10 is a diagram illustrating a working example of the cell switching in the case of the moving route 1, and FIG. 11 is a diagram illustrating a working example of the cell switching in the case of the moving route 2.

In graphs given in upper portions of FIGS. 10 and 11, the axis of abscissa represents a distance at which the mobile stations 1-4 move along arrowed lines depicted in FIG. 9, and the axis of ordinate represents a transition of the reception quality (Ec/No_A) of the cell A and a transition of the reception quality (Ec/No_B) of the cell B in the respective positions of the mobile stations 1-4. Diagrams given in lower portions of FIGS. 10 and 11 further illustrate working examples of the cell switching in the case of three conditions (the conditions 1, 2, and 3), respectively.

The condition 1 represents a case where a throughput [kbps] of the movement destination cell is always smaller than a throughput [kbps] of the movement source cell.

The condition 2 represents a case where the throughput [kbps] of the movement destination cell becomes smaller than that of the movement source cell within the cell switching zone.

The condition 3 represents a case where the throughput [kbps] of the movement destination cell is always equal to or larger than that of the movement source cell.

If the mobile stations 1-4 move along the moving route 1, as depicted in the upper graph of FIG. 10, corresponding to the movement distance of each of the mobile stations 1-4, the reception quality of the cell A declines, while the reception quality of the cell B becomes high. The mobile stations 1-4, at first, perform the HSDPA communications via the HS channel of the cell A. Thereafter, when determining that the mobile stations 1-4 enter the cell switching zone, the cell switching to the cell B is immediately implemented because of the cell switching condition being satisfied under the condition 1. Under the condition 1, the main cell is still the cell B even when the mobile stations 1-4 exit the cell switching zone, and hence the HSDPA communications via the HS channel of the cell B continue as they are.

Under the condition 2, even when determining that the mobile stations 1-4 enter the cell switching zone, the cell switching to the cell B is not implemented till the cell switching condition is satisfied. Further, within the cell switching zone, even if the cell exhibiting the best reception quality is frequently replaced, the cell switching is carried out only once. Under the condition 2 also, when the mobile stations 1-4 exit the cell switching zone, the main cell is the cell B, and therefore the HSDPA communications via the HS channel of the cell B continue.

Under the condition 3, even when determining that the mobile stations 1-4 enter the cell switching zone, the cell switching condition is not satisfied, and hence the cell switching to the cell B is not conducted. Under the condition 3, in the case of determining that the mobile stations 1-4 exit the cell switching zone, the main cell is the cell B, and nevertheless the HSDPA communications via the HS channel of the cell A are performed, thereby switching over the cell to the cell B as the main cell.

If the mobile stations 1-4 move along the moving route 2 as illustrated in the upper graph of FIG. 11 and exist in the vicinity of a border between the cell A and the cell B (in the vicinity of the middle point of the movement distance), the reception quality of the cell B becomes higher than the reception quality of the cell A, and thereafter, the mobile stations 1-4 return to the cell A, with the result that the reception quality of the cell A becomes again higher than the reception quality of the cell B. The mobile stations 1-4, to begin with, perform the HSDPA communications via the HS channel of the cell A.

Under the condition 1, when determining that the mobile stations 1-4 enter the cell switching zone, the cell switching to the cell B is immediately carried out because of the cell switching condition being satisfied. Thereafter, on the occasion of determining that the mobile stations 1-4 exit the cell switching zone because of making further movements, the main cell is the cell A, and therefore the cell switching to the cell A is again conducted.

Under the condition 2, even when determining that the mobile stations 1-4 enter the cell switching zone, the cell switching to the cell B is not performed till the cell switching condition is satisfied. As in the case of the moving route 1, within the cell switching zone, even if the cell exhibiting the best reception quality is frequently replaced, the cell switching is carried out only once. Under the condition 2 also, when the mobile stations 1-4 exit the cell switching zone, the main cell is the cell A, and therefore the cell switching to the cell A is again carried out.

Under the condition 3, even when determining that the mobile stations 1-4 enter the cell switching zone, the cell switching condition is not satisfied, and hence the cell switching to the cell B is not conducted. Under the condition 3, even when determining that the mobile stations 1-4 exit the cell switching zone, the main cell is still the cell A, and consequently the HSDPA communications via the HS channel of the cell A continue as they are.

Operation and Effect in Embodiment

In the mobile communication system according to the embodiment, the mobile station 1, in the case of executing the communications using the communication-enabled data channel only in the single cell such as the HSDPA common channel (HS-PDSCH), measures the reception quality (Ec/No etc) of the CPICH of each cell, and reports the reception quality of the in-communication cell at the present and the reception qualities of the neighboring cells to the base station 10. Note that the reception quality to be reported may be the Ec/No and may also be the CQI determined from the Ec/No.

The base station 10 receives the respective reports of the reception qualities of the individual cells from the mobile station 1, and determines the cell switching of the HS channel with respect to the mobile station 1. The base station 10, upon determining the cell switching, transmits the cell switching event occurrence notifying message of the mobile station 1 to the control station 20. Hereafter, the control station 20, the base station 10 and the mobile station 1 execute the cell switching process as heretofore done.

The base station 10, on the occasion of determining the cell switching of the HS channel, to start with, receives the respective reports of the reception qualities of the individual cells from the mobile station 1, and determines the cell switching zone for the mobile station 1. The cell switching zone is set shorter than the SHO zone of the communication-simultaneously-enabled dedicated data channel in the plurality of cells. The base station 10 decides that the mobile station 1 enters the cell switching zone if the difference between the reception quality of the present cell and the reception quality of the movement destination cell becomes equal to or smaller than the switching threshold value A when the mobile station 1 exists outside the cell switching zone, and decides that the mobile station 1 exits the cell switching zone if the difference between the reception quality of the present cell and the reception quality of the movement destination cell becomes equal to or larger than the switching threshold value B when the mobile station 1 has already existed within the cell switching zone.

Further, the base station 10 calculates the total communication throughput value by totalizing the throughputs of the mobile stations existing in each cell configured by the self base station on the basis of the reception quality of each cell, which is reported from the mobile station 1.

The base station 10, with respect to the mobile station 1 determined to enter the cell switching zone, decides whether or not the total value of the throughputs of the movement destination cell is, as the cell switching condition, smaller than the total value of the throughputs of the present cell. The base station 10, if the cell switching condition such as this is satisfied when the mobile station 1 exists within the cell switching zone, determines the cell switching of the HS channel for this mobile station 1.

With this scheme, according to the embodiment, if the mobile station 1 stays in the vicinity of the cell border, it is feasible to prevent the whole throughput of the base station 10 from decreasing due to the execution of the cell switching for the mobile station 1. The throughput realized before the mobile station 1 moves can be also realized at least after the mobile station 1 has moved. If the plurality of mobile stations 1 exists and if the cell switching of the plurality of mobile stations 1 are performed, the whole throughput can be prevented from decreasing corresponding to the number of the mobile stations 1.

Further, the base station 10 executes the determination about the cell switching condition at a fixed cycle immediately after deciding that the mobile station 1 enters the cell switching zone and during a period for which the mobile station 1 stays in the cell switching zone since it has been once decided that the cell switching condition is not satisfied. The base station 10, when once determining the cell switching for the mobile station 1, decides only whether or not the mobile station 1 exits the cell switching zone.

With this scheme, according to the embodiment, even when the mobile station 1 stays in the vicinity of the cell border, i.e., stays within the cell switching zone, the frequent occurrence of the cell switching can be prevented.

What is claimed is:

1. A base station apparatus forming a plurality of cells, selecting any one of the plurality of cells and performing data communication with a mobile terminal via a data channel of the selected cell, comprising:
    a calculating unit configured to calculate a total communication throughput value for every cell by totalizing communication throughput in the selected cell of each mobile terminal on a cell-basis;
    a receiving unit configured to receive reception quality information of the selected cell and the reception quality information of another movement destination cell in the plurality of cells, which are generated by the mobile terminal;
    a judging unit configured to judge whether or not the mobile terminal is in a cell switching zone by obtaining a difference between the reception quality information of the selected cell and the reception quality information of the movement destination cell, which are received by the receiving unit; and
    a determining unit configured to determine, if the mobile terminal is judged to be in the cell switching zone, the cell switching to the movement destination cell as a newly selected cell by comparing the total communication throughput value of the selected cell with the total communication throughput value of the movement destination cell, which are calculated by the calculating unit.

2. The base station apparatus according to claim 1, wherein the determining unit, after once determining the cell switching for the mobile terminal during a period for which the mobile terminal is in the cell switching zone, does not execute the process of making the comparison between the total communication throughput values for the mobile terminal.

3. The base station apparatus according to claim 1, wherein the determining unit, if the total communication throughput value of the movement destination cell is smaller than the total communication throughput value of the selected cell, determines the cell switching to the movement destination cell as the newly selected cell.

4. The base station apparatus according to claim 1, wherein the determining unit, if the judging unit judges that the mobile terminal exits the cell switching zone, determines the cell switching to the cell, as the newly selected cell, which offers a high reception quality, in the selected cell at the time and other cells.

5. The base station apparatus according to claim 1, wherein the judging unit sets the cell switching zone judged based on the difference between the reception quality information of the selected cell and the reception quality information of the movement destination cell, narrower than a zone in which soft handover control is executed on a data channel enabled to simultaneously communicate in the plurality of cells.

6. The base station apparatus according to claim 1, wherein the receiving unit alternately receives the reception quality information of the selected cell and the reception quality information of the movement destination cell, which are generated by the mobile terminal.

7. The base station apparatus according to claim 1, wherein the determining unit, when determining the cell switching, notifies a control station apparatus controlling the base station apparatus of occurrence of the cell switching.

8. A cell switching determination method executed by a base station apparatus forming a plurality of cells, selecting any one of the plurality of cells and performing data communication with a mobile terminal via a data channel of the selected cell, comprising:
    calculating a total communication throughput value for every cell by totalizing communication throughput in the selected cell of each mobile terminal on a cell-basis;
    receiving reception quality information of the selected cell and the reception quality information of another movement destination cell in the plurality of cells, which are generated by the mobile terminal;
    judging whether or not the mobile terminal is in the cell switching zone by obtaining a difference between the reception quality information of the selected cell and the reception quality information of the movement destination cell, which are received in the receiving; and
    determining, if the mobile terminal is judged to be in the cell switching zone, the cell switching to the movement destination cell as a newly selected cell by comparing the total communication throughput value of the selected cell with the total communication throughput value of the movement destination cell, which are calculated in the calculating.

9. The cell switching determination method according to claim 8, wherein the determining the cell switching includes, after once determining the cell switching for the mobile terminal during a period for which the mobile terminal is in the cell switching zone, executing none of the process of making the comparison between the total communication throughput values for the mobile terminal.

10. The cell switching determination method according to claim 8, wherein the determining the cell switching includes, if the total communication throughput value of the movement destination cell is smaller than the total communication throughput value of the selected cell, determining the cell switching to the movement destination cell as the newly selected cell.

* * * * *